United States Patent [19]

Takaguchi

[11] Patent Number: 4,564,984
[45] Date of Patent: Jan. 21, 1986

[54] POSITIONING CONE FOR CONTAINERS
[75] Inventor: Hiroyuki Takaguchi, Nagasaki, Japan
[73] Assignee: Taiyo Seiki Iron Works Co., Ltd., Osaka, Japan
[21] Appl. No.: 521,918
[22] Filed: Aug. 10, 1983
[30] Foreign Application Priority Data May 23, 1983 [JP] Japan .............................. 58-78530[U]

[51] Int. Cl.⁴ ............................................. B65D 21/02
[52] U.S. Cl. ........................................ 24/287; 24/589; 24/590; 24/606; 24/613; 410/78; 410/82
[58] Field of Search ................... 24/287, 288, 588-590, 24/593, 594, 597, 604, 606, 607, 612, 613; 220/1.5, 23.4; 248/500, 503.1; 292/173, 288, 302, DIG. 14; 403/316, 348; 410/71-86, 90, 91; 108/53.1, 55.3, 55.1

[56] References Cited

U.S. PATENT DOCUMENTS

| | | | |
|---|---|---|---|
| 1,557,581 | 10/1925 | Harrington | 292/173 X |
| 3,011,749 | 12/1961 | Kozak | 410/81 |
| 3,188,042 | 6/1965 | Watters | 410/83 |
| 3,298,071 | 1/1967 | Flora | 24/590 X |
| 3,486,787 | 12/1969 | Campbell | 410/83 X |
| 3,556,456 | 1/1971 | Lunde | 410/82 X |
| 3,796,404 | 3/1974 | Shields | 410/81 X |
| 3,856,247 | 12/1974 | Keighley | 410/77 |
| 3,871,198 | 3/1975 | Miller | 292/173 X |
| 4,277,212 | 7/1981 | Rosaia | 24/287 X |
| 4,352,517 | 10/1982 | Bertolini | 410/81 X |

FOREIGN PATENT DOCUMENTS 647990  9/1962  Canada .................... 220/1.5

Primary Examiner—William E. Lyddane
Assistant Examiner—James R. Brittain
Attorney, Agent, or Firm—Wenderoth, Lind & Ponack

[57] ABSTRACT

A positioning cone for positioning containers stacked one upon another on a ship or the like engages the containers without the need of turning a separate external lever. This arrangement saves time required to clamp the containers to one another and ensures secure and accurate positioning work by the use of a cooperative latch and locking pin.

4 Claims, 11 Drawing Figures

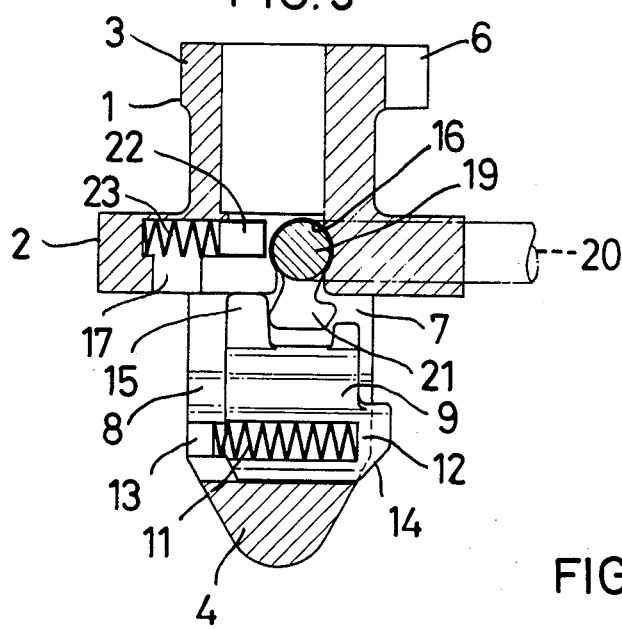
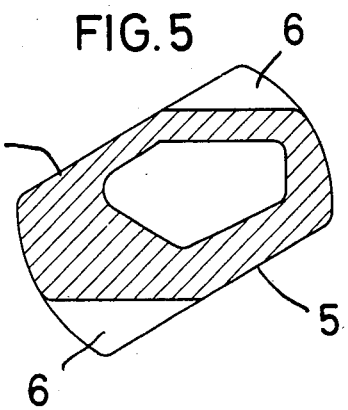
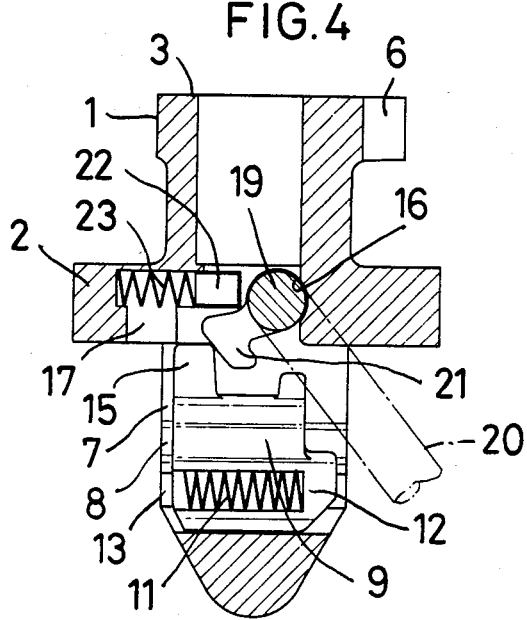

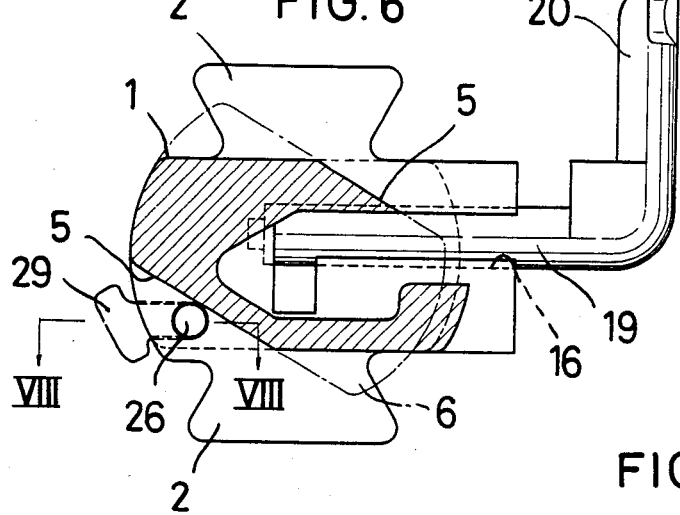
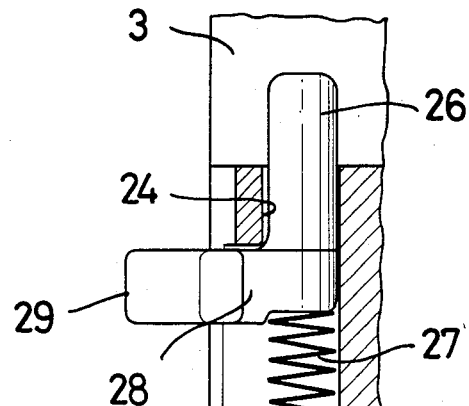
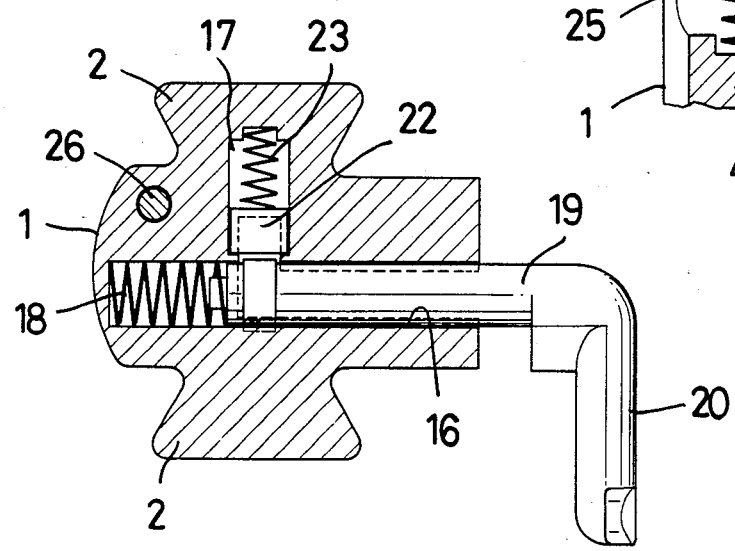

4,564,984

POSITIONING CONE FOR CONTAINERS

BACKGROUND OF THE INVENTION

1. Field of the Invention

The present invention relates to a positioning cone or lock for positioning containers loaded on board a ship and stacked one upon another.

2. Description of the Prior Art

In transporting a lot of containers by ship, if they were merely put one upon another, the upper containers might fall owing to the rolling of the ship. To avoid this, positioning cones or locks are usually set between the lower containers and their supporting surface and between the upper containers and the lower containers. For this purpose, containers are usually provided with holes for engagement with positioning cones at four corners of their top and bottom surfaces. The positioning cones are adapted to be inserted into these holes to position the containers.

With conventional positioning cones of this type, it was necessary to turn a lever to cause the positioning cone to engage the containers after having inserted the cones into the holes in the upper and lower containers. Therefore, it was time-consuming to set up the system. Also, if containers are stacked one upon another in a lot of tiers, it is difficult to operate the lever of the positioning cones at higher tiers above the floor. If the lever were not securely operated due to this difficulty, the upper containers might fall.

OBJECT AND SUMMARY OF THE INVENTION

An object of the present invention is to provide a positioning cone which can be easily set up simply by inserting each cone into the holes in the upper and lower containers.

In accordance with the present invention, there is provided a positioning cone for containers comprising a body in the shape of a quadrangular prism, said body being formed with a pair of flanges which divide said body into upper and lower shanks, said lower shank having a conical surface at its bottom and being formed with a hole extending therethrough laterally, a latch slidably supported in said hole and having at one side thereof a guide surface of a shape corresponding to said conical surface, said latch having a first position where it is retracted into said hole and a second position where it is protruding from said hole, a spring for urging said latch outwardly, means for keeping said latch in said second position, a lever rotatably supported on said body for operating said latch from said second position to said first position, and means for causing said latch to move in a direction transverse to the axis of said lever when said lever is turned.

Other objects and features of the present invention will become apparent from the following description taken with reference to the accompanying drawings.

BRIEF DESCRIPTION OF THE DRAWINGS

FIG. 3 is a vertical sectional side view thereof with the latch protruded;

FIG. 4 is a view similar to FIG. 3 but with the latch withdrawn into the hole;

FIG. 5 is a sectional view taken along the line V—V of FIG. 2;

FIG. 6 is a sectional view taken along the line VI—VI of FIG. 2;

FIG. 7 is a sectional view taken along the line VII—VII of FIG. 2;

FIG. 8 is a sectional view taken along the line VIII—VIII of FIG. 6;

DETAILED DESCRIPTION OF THE PREFERRED EMBODIMENT

Figure 1:
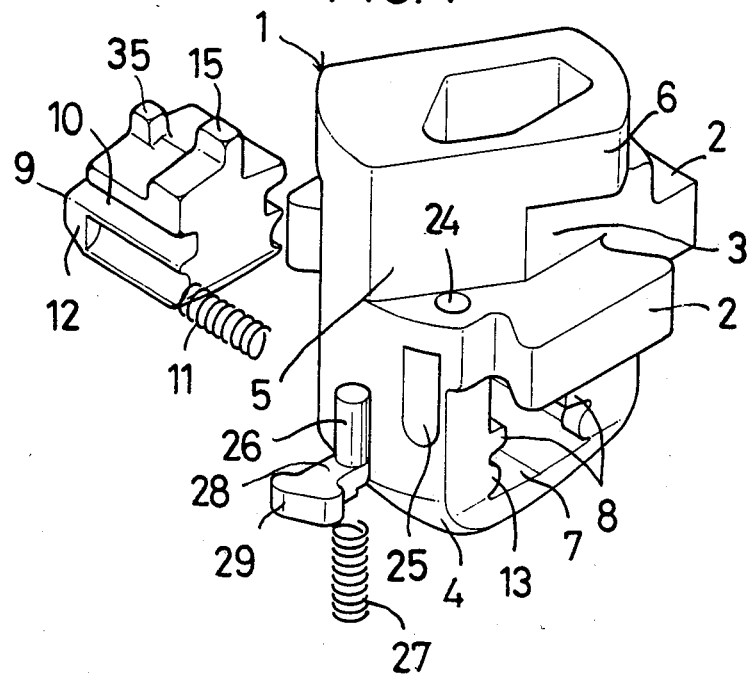
FIG. 1 is an exploded perspective view of an embodiment of this invention.

Referring to FIG. 1, the positioning cone of this invention has a body 1 generally in the shape of a quadrangular prism and is formed with a pair of flanges 2 at each side of the body 1 to limit insertion of the body 1 into a corner of a container. The flanges 2 divide the body 1 into upper and lower shanks 3 and 4 respectively.

Figure 2:
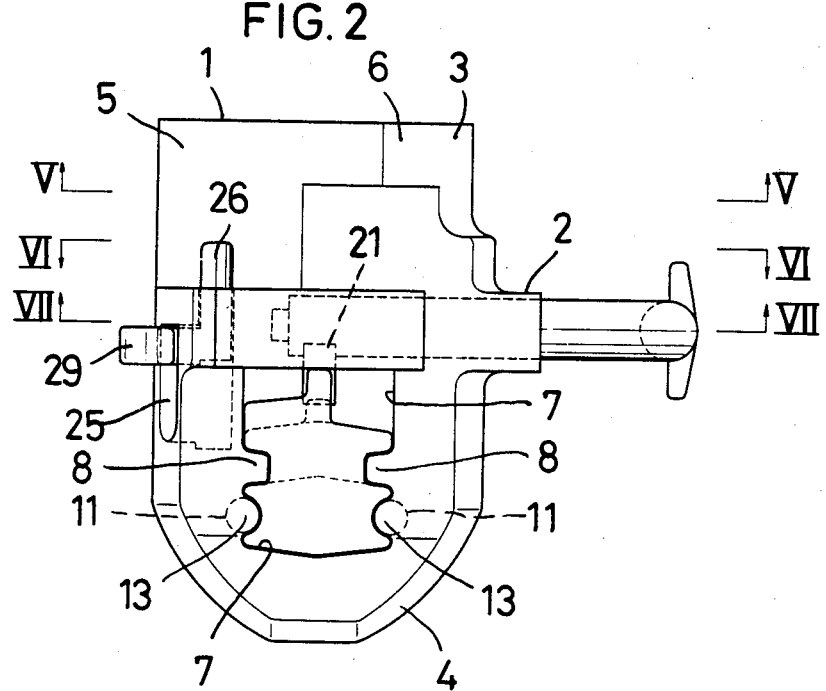
FIG. 2 is a front view thereof in its assembled state.

The upper shank 3 is formed diagonally at one pair of corners with a pair of oblique surfaces 5 which are parallel to each other throughout its height, and diagonally at the other pair of corners with a pair of shoulders 6 above the upper surface of the flanges 2 (FIGS. 2 and 5). The external surface of the lower shank 4 is substantially conical (FIGS. 2 and 3) and the lower end is rounded so as to facilitate insertion into the hole in a container. Returning to FIG. 1, a hole 7 for receiving a latch 9 is provided in the lower shank 4. The latch 9 is slidably supported by a pair of projections 8 which are provided on the side walls of the hole 7 and are adapted to fit in guide grooves 10 provided in both sides of the latch 9.

A pair of springs 11 are disposed between the side surfaces of the latch 9 and the side walls of the hole 7. One end of each spring 11 abuts on a seat 12 provided at each side of the latch 9 while the other end abuts on a seat 13 provided at each side of the hole 7. The latch 9 is urged by the springs 11 outwardly.

Referring to FIG. 3, a guide surface 14 provided at the lower end of the latch 9 is inclined in the same direction as the oblique surfaces 5 (FIGS. 1, 2, and 5) of the lower shank 4. A lug 15 is provided on the latch 9 at the rear end of its top (FIG. 3).

Holes 16 and 17 for receiving a lever and a stopper, respectively, are provided above the hole 7 and communicate therewith. The hole 16 extends perpendicularly to the direction in which the latch 9 moves while the hole 17 extends parallel therewith.

As shown in FIG. 7, the hole 16 accommodates a spring 18 and a lever 19. A portion of the lever 19 projects outwardly from the hole 16 and is provided with a handgrip 20 at its end. The inner end of the lever 19 disposed within the hole 16 is provided with an L-shaped lug 21 (FIG. 3), which engages the lug 15 provided on the top of the latch 9 so as to hold the latch 9 slightly projecting outwardly from the hole 7. Because of this engagement, the latch 9 is prevented from getting out of the hole 7.

The hole 17 accommodates a stopper 22 and a spring 23. This spring 23 urges the stopper 22 toward the lever 19. The stopper 22 engages the lug 21 to limit the angle at which the lever 19 turns. However, the arrangement for limiting the rotation angle of the lever 19 is not limited to this particular embodiment but any other means may be adopted.

As shown in FIGS. 1 and 8, a vertical hole 24 is provided in the lower flange 2 formed in the middle portion of the body 1. The hole 24 opens in the proximity of the oblique surface 5 provided on the upper shank 3. A vertically elongated hole 25 is provided in the lower shank 4 and communicates with the hole 24. The hole 24 accommodates a pin 26 and a spring 27 by which the pin 26 is urged upwardly to protrude from the hole 24.

The pin 26 is provided with a shaft 28 (FIG. 1) which extends sideways from its lower end so that the shaft 28 projects outwardly from the elongated hole 25. A knob 29 is formed on the outer end of the shaft 28. The pin 26 is slidable vertically against the resilience of the spring 27. The pin 26 is withdrawn down into the hole 24 when the knob 29 is pulled down.

The positioning cone of this invention is of the above-described structure. These positioning cones are to be put between socket fittings secured to the corners of containers put one upon another and serve to prevent the containers in upper tiers from falling.

Figure 9:
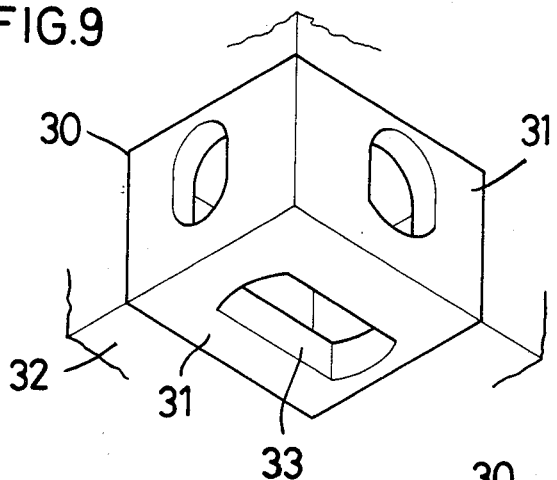
FIG. 9 is a perspective view of the socket fitting secured to a corner of the container.

A socket fitting 30 is in the the shape of a hollow box (FIG. 9) having its surfaces 31 which are even with the surfaces of a container 32 and are provided with holes 33.

Figure 10:
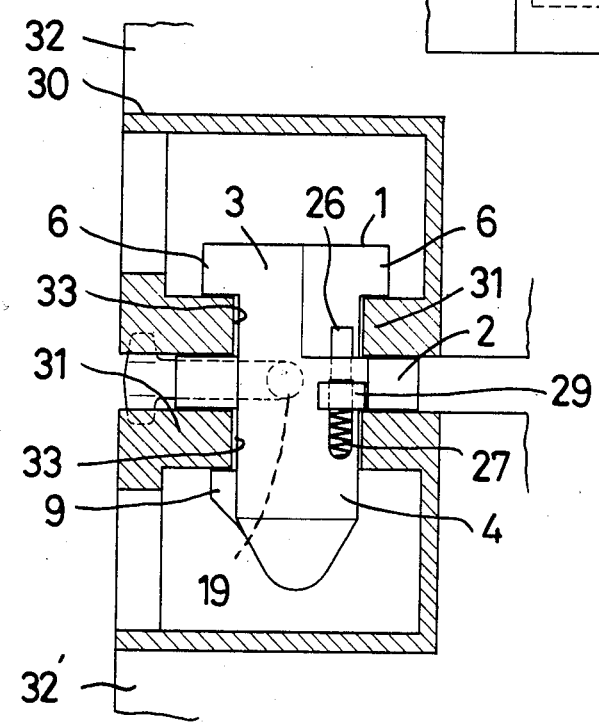
FIG. 10 is a sectional view showing the embodiment of this invention set between two containers stacked one upon another.

A container 32 is suspended at a quay or on board a ship. As shown in FIG. 10, the upper shanks 3 of the positioning cones are inserted into the holes 33 provided at four corners of the bottom surface of the container 32. The upper end of the pin 26 butts against the under surface of the fitting 30, so that the pin 26 is pushed down against the resilience of the spring 27. When the upper shank 3 has been inserted until the upper surfaces of the flanges 2 touch the bottom surface of the bottom plate 31 of the socket fitting 30, the pin 26 completely retracts into the hole 24 (FIG. 1) and the shoulders 6 project above the upper surface of the bottom plate 31.

Figure 11:
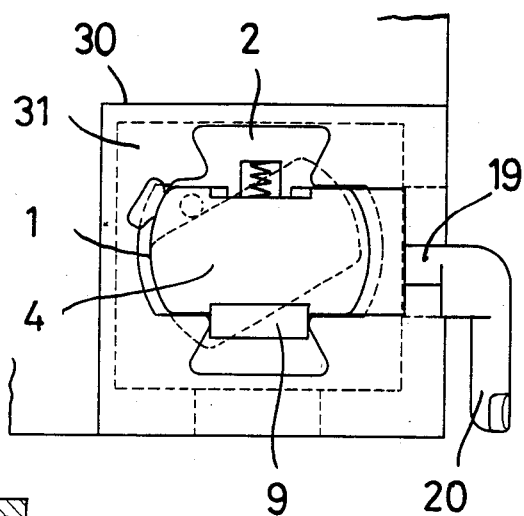
FIG. 11 is a bottom view of the embodiment set at the bottom of the container.

Returning to FIG. 10, with the upper surfaces of the flanges 2 in contact with the under surface of the bottom plate 31, the body 1 is turned until the shoulders 6 rest on the upper surface of the bottom plate 31 so as to prevent the positioning cone from falling out of the hole 33. Also, the pin 26 will come in the range of the hole 33 and is pushed up by the spring 27, so that it projects into the hole 33 and prevents the body 1 from turning (FIGS. 10 and 11).

Then the container 32 is lifted and moved until it comes to over another container 32' which has already been taken aboard (FIG. 10). It is then lowered so as to insert the lower shanks 4 into the holes 33 provided at the four corners of the upper surface of the container 32'. Then the side walls of each hole 33 butt against the guide surfaces 14 (FIG. 1) of the latch 9, pushing the latch 9 into the hole 7 against the resilience of the springs 11. Returning to FIG. 10, after passage through the hole 33, the latch 9 again projects outwardly by the resilience of the springs 11 (FIG.1) and engages the under surface of the top plate 31. Consequently the upper container 32 is now prevented from jumping up or moving sideways (FIG. 10).

When unloading the containers at a port of discharge, the latches 9 of the positioning cones are moved into the holes 7 (FIG. 1) by turning their levers 19 (FIG. 10) so that the container 32 may be released. Then the pins 26 are withdrawn down into the holes 24 (FIGS. 1 and 8) by pushing down the knob 29 so that the positioning cone will be removed.

For the above-mentioned purpose, the handgrip 20 is turned from the position shown with dotted lines in FIG. 3 to the position shown with dotted lines in FIG. 4. As shown in both FIGS. 3 and 4, the L-shaped lug 21 on the lever 19 pushes the lug 15 on the latch 9 so as to move the latch 9 farther to the left into the hole 7 against the resilience of the springs 11. When the lug 21 butts the stopper 22 so that the lever 19 is obstructed from turning any farther (FIG. 4), a front edge of the lug 15 abuts on the end surface of the lug 21 so that the latch 9 is held accommodated in the hole 7.

Returning to FIG. 10, when the upper container 32 is raised, the lower shanks 4 of the cones slip out of the holes 33 in the lower container 32'. After raising and then lowering the upper container 32 32 on to the ground at a quay, the pin 26 is pulled down by operating the knob 29. The body 1 is then turned so as to disengage the shoulders 6 from the top surface of the plate 31 of the socket fitting 30. The positioning cone can then be removed from the bottom of the container 32.

In the preferred embodiment shown in FIG. 1, a single latch 9 is provided in the hole 7. However, a plurality of latches 9 may be provided. For example, a pair of latches 9 may be arranged in parallel with each other within the hole 7 so as to slide in opposite directions to each other so that they can be withdrawn into the hole 7 simultaneously when a single lever 19 on handgrip 20 (FIGS. 3 and 4) is operated.

Although in the embodiment shown in FIG. 1, a pair of springs 11 are provided on both sides of the latch 9 to urge the latch 9 outwardly, the springs 11 may be omitted if the spring 18 (FIG. 7) is adapted to produce a twisting moment when the lever 19 is turned, and if a second lug 35 (FIG. 1) is provided on the upper surface of the latch 9 opposite to the lug 15 and is adapted to engage the lug 21 (FIGS. 3 and 4) of the lever 19.

From the foregoing description, it will be apparent that the present invention permits automatic coupling of a positioning cone with a container and thereby permits the reduction of time required for the work of putting the containers on top of one another.

What is claimed is:

1. A cone for positioning containers, comprising:
a body having a first flange and a second flange and being divided by said flanges into an upper shank and a lower shank whereby the upper shank is engaged within an aperture in an upper cargo container and the lower shank is engageable within an aperture in a lower cargo container for relative positioning of the containers, said lower shank having a conical surface on its bottom and also having a hole extending laterally therethrough;
a latch slidably supported in the hole, said latch having a first position retracted in the hole, and a second position protruding from the hole whereby the lower shank is operatively secured within the aperture in the lower cargo container;
a spring means, positioned inside the hole between the latch and the lower shank, for urging the latch into the second position;
lever means, pivotably supported in the body, for moving the latch from the second position to the first position;
first lug means, connected to the lever means, for securely keeping the latch in the first position;

second lug means, connected to the latch, for engaging with the first lug means; and handgrip means, connected to the lever means and extending outside of the body, for turning the lever means.

2. The cone, according to claim 1, wherein:

said upper shank has an external pair of oblique surfaces which are parallel to each other.

3. The cone, according to claim 2, wherein:

said second flange has an upper surface; and said lower shank has a second hole located adjacent to one of the pair of oblique surfaces, said second hole extending vertically therein and further extending through the upper surface of the second flange.

4. The cone, according to claim 3, further comprising:

pin means, arranged in the second hole, for sliding vertically in the second hole and for projecting partially beyond the upper surface of the second flange; and second spring means, positioned in the second hole beneath the pin means, for urging the pin means to slide vertically in the second hole and to project partially beyond the upper surface of the second flange.

* * * * *